May 29, 1951  A. W. SERIO  2,554,642
BAND AND HANDLE ATTACHMENT FOR COOKING UTENSILS
Filed May 3, 1946
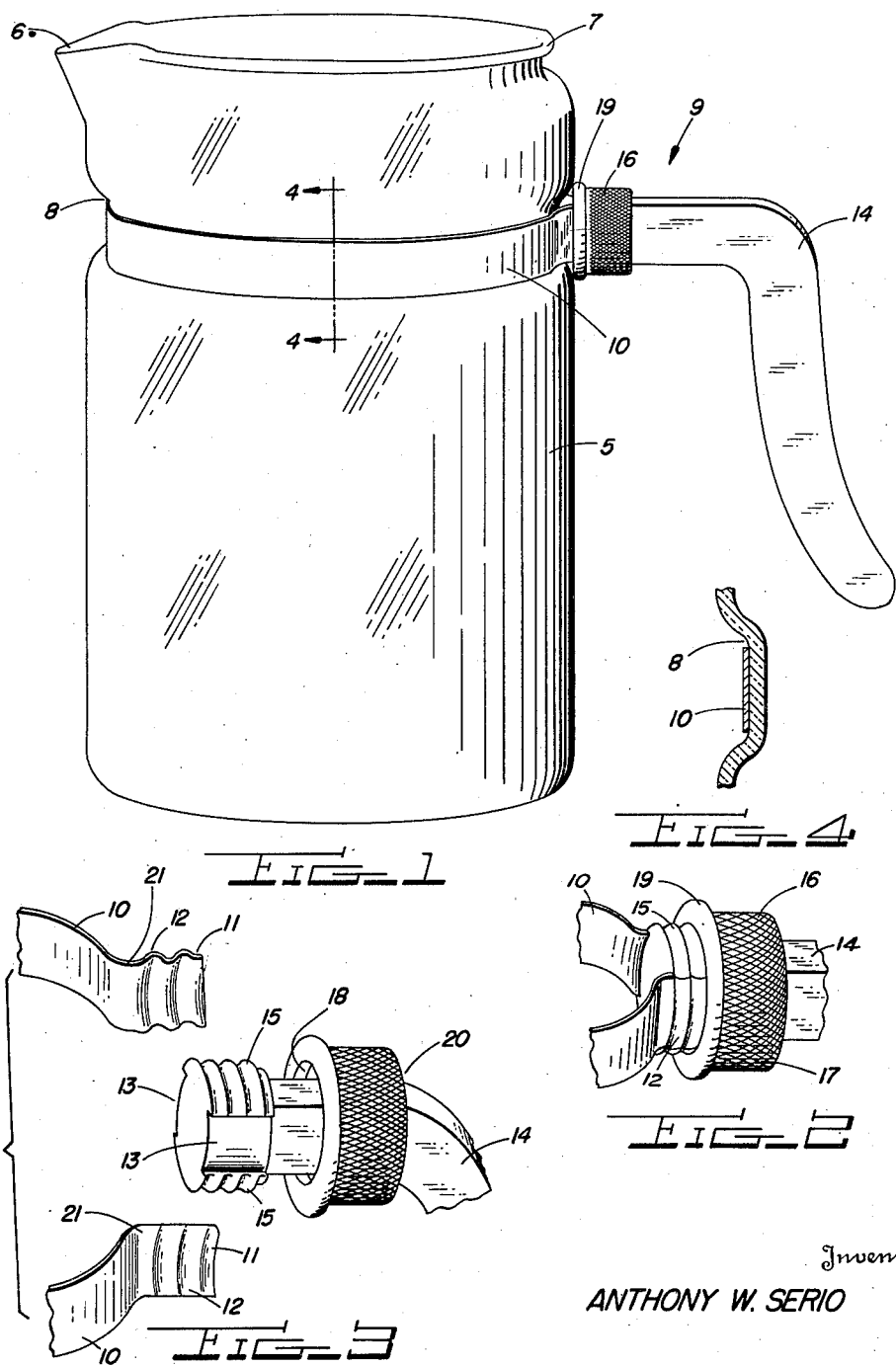
Inventor
ANTHONY W. SERIO
By Shoemaker & Mattare
Attorneys Patented May 29, 1951

2,554,642

UNITED STATES PATENT OFFICE 2,554,642

BAND AND HANDLE ATTACHMENT FOR COOKING UTENSILS

Anthony W. Serio, Elmira, N. Y., assignor of one-half to Harry P. Serio, Elmira, N. Y.

Application May 3, 1946, Serial No. 667,080

8 Claims. (Cl. 294—27)

This invention relates to a band and handle attachment for cooking utensils. The invention is more particularly directed to a band and handle attachment for glass cooking utensils.

It is quite difficut to provide a handle attachment for glass or other cooking utensils where such utensils are heated in cooking or for other domestic purposes. This is due to the fact that provision must be made for expansion and contraction of any band-handle attachment to such a utensil. In other words, if the utensil is of glass and the band-handle attachment of metal, provisions must be made for differences in coefficient of expansion between the two different materials. In the prior band-handle attachments for such utensils the connection of the band with the handle has been effected by means of screws which, of course, provides a more or less rigid and permanent connection between the band and the handle thus making no provision for differences of coefficient of expansion between different materials such as glass and metal. Moreover the screws or bolts used, as the case may be, become loosened and the handle consequently is loose and not fixedly associated with the utensil and, under such conditions, hot liquids or other materials while being discharged from the utensil might well burn the cook or not be directed from the utensil into another container or the like.

In my invention I provide a flexible springy band of metal or other suitable material which is preferably disposed in a circumferential groove or recess in the utensil. This band is attached by novel means to the handle which projects laterally or away from the utensil, of course, and provides for attachment to utensils of varying diameters as well as permitting the necessary expansion and contraction of the band with respect to the utensil or vice versa and still effecting a substantially tight fit with utensil. The band substantially surrounds or encircles a portion of the utensil and when associated with the handle results in a fixed relationship therewith and also with the utensil.

In view of the foregoing one object of my invention is to provide a band and handle attachment for cooking utensils and the like which embodies novel means of securing the band about the utensil and attachment of the ends of the band to the handle.

Another object of my invention is to provide a band and handle attachment for cooking utensils wherein the utensil and the band are fabricated of different materials and connecting means for the band and handle which compensate for differences in coefficient of expansion with respect to the band and handle with utensil or vice versa.

Another object of my invention is to provide a band and handle attachment for glass or similar cooking utensils and preferably disposing the band in a circumferential groove in the utensil and the construction of band and its attachment with the handle being such that the same may be applied to utensils of varying diameters.

Another object of my invention is to provide a flexible springy steel or other metallic band for encircling a portion of a utensil and which band has its free ends partially screw threaded and which screw threads mate with other partial screw threads on the handle proper and a nut for engaging the aforesaid screw threads when properly aligned and assembled for effecting the connection between the band and handle.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims, may be resorted to without departing from the spirit or sacrificing any advantages of the invention.

In the drawings:

Fig. 1 is a side elevational view of the band and handle attached to a glass receptacle.

Fig. 2 is a fragmentary perspective view showing the attachment of the screw-threaded ends of the band mating with the screw threads on the end of the handle and the nut about to be engaged with the screw threads.

Fig. 3 is an exploded view in perspective showing the screw-thread ends of the band and the partial screw-thread end of the handle with the nut associated with the latter and about to be assembled as in Fig. 1, and Fig. 4 is a vertical sectional view through one wall portion of the utensil such as on line 4—4 in Fig. 1 and showing the band disposed in the circumferential groove in the utensil.

The invention will be more readily understood by referring to the drawings in detail where like reference numerals in the several figures denote the same parts.

The glass or other similar utensil 5 is subtantially cylindrical, as shown, but of course may be of any desired contour and shape. The utensil is provided with a pouring lip or spout 6 and a beaded upper edge 7 surrounds the open or top end thereof. Intermediate the top and bottom of the utensil there is provided a circumferential groove or recess 8.

The band and handle attachment for the utensil is designated generally at 9. The band 10 which is preferably of steel or other springy metal or the like substantially encircles or surrounds the utensil 5 in the groove 8. This band has free arcuate ends 11 which extend at right angles or outwardly therefrom and are provided with exterior partial screw threads 12. The partially screw-threaded ends 11 of the band are disposed in diametrically opposed arcuate recesses or cut-out portions 13 formed at the end of the right-angularly shaped handle 14. These partially formed screw threads 12 at the ends of the band mate with the partially formed arcuate screw threads 15 at the end of the handle and when assembled as in Figs. 1 and 2 continuous full screw threading is thus provided between the said ends of the band and the screw threads at the end of the handle. Thus, when the band is positioned about the utensil, preferably in a groove as shown, the nut 16 which is knurled at 17 and interiorly screw threaded at 18 and provided with a flange 19 and an opening therethrough at 20 is moved up over the free end of the handle onto the angle portion thereof and by turning same engages the aforesaid screw threads and thus secures the ends 11 of the band together with the screw-threaded end of the handle and provides a very effective connection between the band and handle for securing the same to the utensil.

In order to compensate for expansion and contraction and also to provide for attachment of the band and handle to utensils of varying diameters the free angularly disposed ends 11 of the band are each provided with a portion 21 which is not screw threaded and does not engage the utensil or is not engaged by the nut 16. This plain portion adjacent ends 11 of the band will, of course, be contracted when the nut 16 is in securing position as in Fig. 1 with the flange 19 thereof engaging a portion of the wall of the utensil opposite the bottom and top of the groove 8. In other words, the portion 21 in the ends 11 is free, so to speak, and will take care of expansion and contraction of the band with respect to the utensil under varying degrees of temperatures. Then too, this portion 21 will be flexed outwardly or inwardly and thus allow for the attachment of the band to utensils of varying diameters.

I claim:

1. A band and handle attachment for utensils wherein the band encircles a portion of the outer circumference of the utensil and is provided with free outwardly extended ends with partial screw threads thereon, a handle having an end portion thereof in engagement with the free ends of the band and provided with partial screw threads thereon complemental to and aligned with the partial screw threads on the ends of the band, and interiorly screw threaded means for engaging and securing the free end portions of the band and the end of the handle together about the utensil.

2. A band and handle attachment for utensils, the band being adapted to encircle a portion of the utensil and having spaced free ends extending outwardly therefrom with partial screw threads thereon, the ends of the handle being provided with oppositely disposed recesses for receiving the said free ends of the band therein and with partial screw threads thereon complemental to and aligned with the partial screw threads on the ends of the band, whereby a continuous screw thread at the end of the handle is provided, and interiorly screw threaded securing means engaging both of said free ends of the band and the screw threads on the handle end for securing the band to the handle.

3. A band and handle attachment for utensils, the utensil being provided with a circumferential groove, the band being disposed in the groove and having spaced arcuate free ends projecting outwardly beyond the groove, the said free ends having partial screw threads thereon, the handle having arcuate spaced end portions with screw threads thereon and providing oppositely disposed arcuate recesses for engagement and alignment therein of the said screw threaded ends of the band with the screw threads on the handle, and an interiorly screw threaded nut for securing the said screw threaded ends of the band and the screw threaded end of the handle to and about the utensil.

4. A band and handle attachment for glass or other cooking utensils wherein the band that is disposed in a circumferential groove in the utensil substantially encircles a portion of the utensil, the band having partially threaded arcuate spaced free ends, the handle having arcuate spaced recesses therein between partially threaded spaced raised arcuate portions with the said ends of the band in the said recesses and the screw threads on the ends of the band and the screw threads on the end of the handle in alignment, an interiorly screw threaded nut for engaging the aforesaid screw threads to secure the free ends of the band and the end portion of the handle together, the said nut when in securing position engaging a portion of the utensil above and below the circumferential groove, and the band being constructed so as to provide for expansion and contraction and also to provide for its attachment with utensils of varying diameters.

5. A band and handle attachment for utensils wherein the band encircles a portion of the outer circumference of the utensil and has free outwardly extended end elements, a handle having an end element in engagement with the free ends of the band, one of said elements having screw threads thereon, and an interiorly screw threaded means for engaging the screw threads on one of the elements for securing the free end portions of the band and the end of the handle together about the utensil.

6. A band and handle attachment for utensils, the band being adapted to encircle a portion of the utensil and having spaced free ends extending outwardly therefrom, the end of the handle being provided with oppositely disposed recesses for receiving the said free ends of the band therein, complemental and cooperating means on the free ends of the band and on the end of the handle, and means engaging the said complemental and cooperating means for securing the band about the utensil and to the handle.

7. A band and handle attachment for utensils as defined in and by claim 1 wherein a portion of each of the free ends of the band, and adjacent the connection of the interiorly screw threaded means for securing the free end portions of the band and the end of the handle together serves as means to allow for expansion and contraction of the band with respect to the vessel and to which vessel the band is secured.

8. A band and handle attachment for utensils as defined in and by claim 2 wherein a portion of each of the free ends of the band, and adjacent the connection of the interiorly screw threaded means for securing the free end portions of the band and the end of the handle together serves as means to allow for expansion and contraction of the band with respect to the vessel and to which vessel the band is secured.

ANTHONY W. SERIO.

REFERENCES CITED

The following references are of record in the file of this patent:

UNITED STATES PATENTS

| Number | Name | Date |
|---|---|---|
| 1,148,561 | Winn | Aug. 3, 1915 |
| 1,977,364 | Wolcott | Oct. 16, 1934 |
| 2,009,473 | Britton | July 30, 1935 |
| 2,275,876 | Werfel | Mar. 10, 1942 |
| 2,305,492 | Poglein | Dec. 15, 1942 |
| 2,359,189 | Alsdorf | Sept. 26, 1944 |
| 2,395,140 | Peterson | Feb. 19, 1946 |